(12) United States Patent
Ikezoe

(10) Patent No.: US 7,361,425 B2
(45) Date of Patent: Apr. 22, 2008

(54) FUEL CELL

(75) Inventor: Keigo Ikezoe, Hadano (JP)

(73) Assignee: Nissan Motor Co., Ltd., Kanagawa (JP)

( * ) Notice: Subject to any disclaimer, the term of this patent is extended or adjusted under 35 U.S.C. 154(b) by 672 days.

(21) Appl. No.: 10/507,735

(22) PCT Filed: Mar. 18, 2003

(86) PCT No.: PCT/JP03/03235

§ 371 (c)(1),
(2), (4) Date: Sep. 15, 2004

(87) PCT Pub. No.: WO03/088394

PCT Pub. Date: Oct. 23, 2003

(65) Prior Publication Data

US 2005/0255365 A1    Nov. 17, 2005

(30) Foreign Application Priority Data

Apr. 12, 2002   (JP) ............................. 2002-110582

(51) Int. Cl.
*H01M 8/02* (2006.01)
(52) U.S. Cl. .......................................... 429/38; 429/39
(58) Field of Classification Search .................. 429/38, 429/39
See application file for complete search history.

(56) References Cited

U.S. PATENT DOCUMENTS

| | | | |
|---|---|---|---|
| 4,548,876 A | 10/1985 | Bregoli | |
| 4,767,680 A | 8/1988 | Hijikata et al. | |
| 5,558,955 A * | 9/1996 | Breault et al. | ................. 429/38 |
| 6,037,072 A | 3/2000 | Wilson et al. | |
| 6,051,331 A | 4/2000 | Spear, Jr. et al. | |
| 6,258,476 B1 * | 7/2001 | Cipollini | .................. 429/38 X |
| 6,617,068 B2 * | 9/2003 | Dufner et al. | ............ 429/38 X |
| 7,087,330 B2 * | 8/2006 | Cipollini | .................. 429/39 X |

FOREIGN PATENT DOCUMENTS

EP    1 154 505 A1    11/2001

(Continued)

OTHER PUBLICATIONS

Japanese Office Action issued in corresponding Japanese Patent Application No. JP 2002-110582, dated Jan. 9, 2007.

(Continued)

*Primary Examiner*—Stephen J. Kalafut
(74) *Attorney, Agent, or Firm*—McDermott Will & Emery LLP

(57) ABSTRACT

A fuel cell has an anode electrode (3), a cathode electrode (5), the membrane electrolyte (4) sandwiched by the anode and cathode electrodes, two separators (1, 7), a first current collector (2) and a second current collector (6). The two separators (1, 7) each having a flat plate-shaped porous body are disposed to sandwich the two electrodes. The two separators are water permeable. The first current collector (2) is disposed between the anode electrode and one separator, the first current collector forming a first gas channel allowing flow of the fuel gas. The second current collector (6) is disposed between the cathode electrode and the other separator, the second current collector forming a second gas channel allowing flow of the gaseous oxidant.

9 Claims, 8 Drawing Sheets

| | FOREIGN PATENT DOCUMENTS | |
|---|---|---|
| JP | 6-231793 | 8/1994 |
| JP | 07-045294 | 2/1995 |
| JP | 8-203543 | 8/1996 |
| JP | 8-250130 | 9/1996 |
| JP | 9-63602 | 3/1997 |
| JP | 9-289027 | 11/1997 |
| JP | 11-283636 | 10/1999 |
| JP | 2000-82475 | 3/2000 |
| JP | 2000-100457 | 4/2000 |
| JP | 2000-123850 | 4/2000 |
| WO | WO 00/26980 | 5/2000 |
| WO | WO 01/26172 A1 | 4/2001 |

OTHER PUBLICATIONS

European Office Action issued in European Patent Application No. EP 03 712 741.2, mailed Apr. 25, 2007.

* cited by examiner

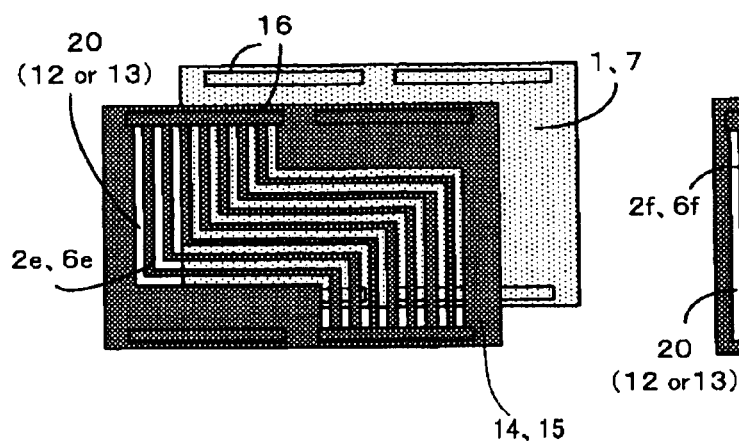
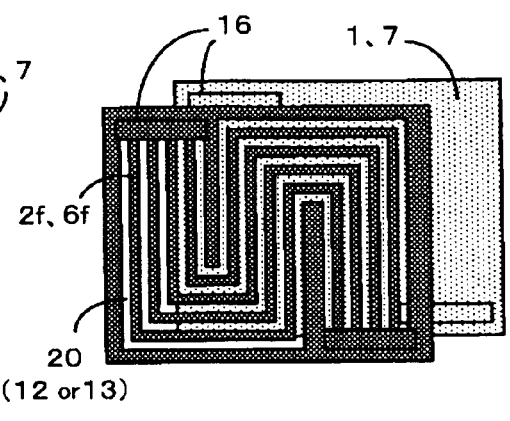
FIG. 5A					FIG. 5B
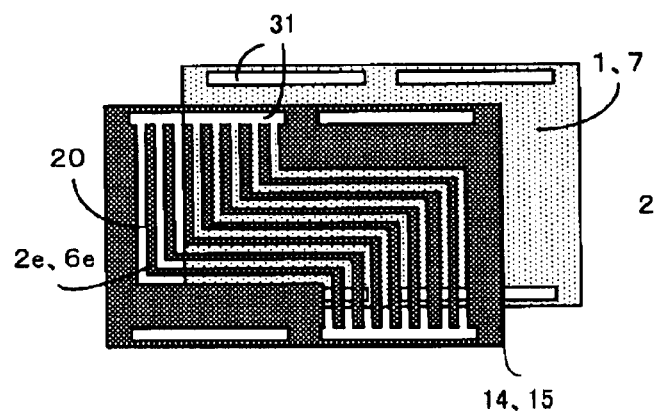
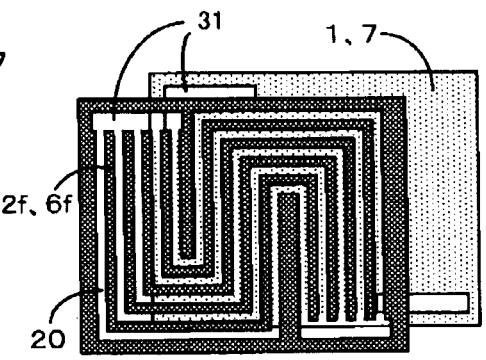
FIG. 5C					FIG. 5D

FUEL CELL

FIELD OF THE INVENTION

This invention is related to a fuel cell, and in particular to improvements to the cell structure of a fuel cell.

BACKGROUND OF THE INVENTION

A fuel cell normally has a pair of electrodes comprising an anode and a cathode sandwiching a membrane electrolyte. Fuel gas containing hydrogen is supplied to the anode. A gaseous oxidant containing oxygen is supplied to the cathode. Electrochemical reactions occurring on surface of the membrane electrolyte produce a voltage.

The reaction shown in Equation (1) occurs on the anode.

$$H_2 \rightarrow 2H^+ + 2e^- \quad (1)$$

The reaction shown in Equation (2) occurs on the cathode.

$$2H^+ + 2e^- + (1/2)O_2 \rightarrow H_2O \quad (2)$$

Hydrogen gas or a fuel gas containing hydrogen supplied by a hydrogen storage device is used as the fuel gas. The fuel gas is a hydrogen-rich gas resulting from the reforming operation applied to natural gas, methanol or gasoline for example. Air may be used as the gaseous oxidant.

In the prior-art example, two gas diffusion electrodes, each comprising a catalyst layer and a gas diffusion layer, are provided as an anode and cathode to sandwich the membrane electrolyte, forming a "membrane-electrode-assembly" (MEA). A current collector is provided to function as a channel-forming member on the outer side of the gas diffusion electrodes. A fuel cell stack is formed by laminating unit cells each containing a MEA, a pair of current collectors sandwiching the MEA, and a separator for separating adjacent unit cells. Normally the current collector(s) and the separator are integrated to form a plate-shaped member called a bi-polar plate.

The bi-polar plate serves as an electrically conductive member for creating an electrical connection between unit cells. It also functions as a partition for separating gas supplied respectively to the anode and cathode and has the function of maintaining the gas flow channel. Since it is necessary to maintain the homogeneity of gas flow, the bi-polar plate must be manufactured using highly accurate processing operations.

A bi-polar plate is sometimes porous from the point of view of water management. Water management means the recovery of produced water and humidification in the gas in the fuel cell. The bi-polar plate is usually moisturized by pure water flowing in a pure water channel formed on/in the bi-polar plate. In other words, the water flows into the porous sections of the bi-polar plate. When the moisturized bi-polar plate comes into contact with dry gas in the gas channel, water vaporizes from the porous sections if the vapor pressure of the supplied gas has not reached a saturation vapor pressure. Furthermore water produced as a result of Equation (1) and (2) is absorbed into the porous bi-polar plate as a result of setting the pressure in the gas channel to be higher than the pressure in the pure water channel. In this manner, excess water is removed from the gas channel and can be prevented from blocking the gas channel.

However since a bi-polar plate used for the purpose of water management as described above presents manufacturing difficulties due to its low mechanical strength.

Tokkai Hei 11-283636 published by the Japanese Patent Office in 1999 discloses a bi-polar plate formed by laminating a plate provided with linear slits and a flat plate. Tokkai Hei 7-45294 published by the Japanese Patent Office in 1995 discloses a plurality of thin pieces comprising the current collector which are disposed at intervals on a flat plate acting as the separator. The thin pieces define the gas channel.

SUMMARY OF THE INVENTION

However the prior-art technique disclosed in Tokkai Hei 11-283636 increases the pressure drop as a result of the increase in the complexity of the route taken by the gas because the structure of the manifold is complicated. When water management as described above is performed using a porous bi-polar plate, it is necessary to maintain a fixed and accurate pressure difference at all times between the pure water channel and the gas channel. However it is difficult to maintain the pressure difference when the route to the gas channel from the manifold has a complicated structure.

Furthermore although the gas channel in the prior-art technique disclosed by Tokkai Hei 7-45294 is not complicated, manufacturing costs are increased as a result of disposing the extremely narrow channels one by one onto the flat plate in an accurate manner.

It is therefore an object of this invention to provide a low-cost fuel cell and to reduce pressure loss of a gas supplied to the fuel cell.

In order to achieve above objects, this invention provides a fuel cell having an anode electrode, a cathode electrode and the membrane electrolyte sandwiched by the anode and cathode electrodes, and producing an electromotive force between the two electrodes by electrochemical reactions between a gaseous oxidant supplied to the cathode and a fuel gas supplied to an anode. The fuel cell comprises: two separators each comprising a flat plate-shaped porous body, the two separators being disposed to sandwich the two electrodes, the two separators being water permeable; a first current collector disposed between the anode electrode and one separator, the first current collector and said one separator forming a first gas channel allowing flow of the fuel gas; and a second current collector disposed between the cathode electrode and the other separator, the second current collector and the other separator forming a second gas channel allowing flow of the gaseous oxidant.

Further this invention provides A method of manufacturing a fuel cell, comprising: forming a separator from a porous plate; providing a current collector plate which comprises a current collector and which has a larger surface area than the separator; providing slits forming gas channels on the current collector plate; fixing the current collector plate to one side of the separator to form a bi-polar plate such that the separator does not cover ends of the slits; cutting off sections of the current collector plate which are not covered by the separator; and laminating an anode electrode, a cathode electrode, a membrane electrolyte, and the bi-polar plate. The method of manufacturing a fuel cell may further comprises: providing another current collector plate which comprises a current collector and which has a larger surface area than the separator; providing slits forming pure water channels on said another current collector plate; fixing said another current collector plate to the other side of the separator such that the separator does not cover ends of the slits; and cutting off sections of said another current collector plate which are not covered by the separator.

The details as well as other features and advantages of this invention are set forth in the remainder of the specification and are shown in the accompanying drawings.

BRIEF DESCRIPTION OF THE DRAWINGS

FIG. 5A shows plan views of an exemplary separator and an exemplary current-collector plate of a fuel cell before the internal manifold is formed. FIG. 5B shows plan views of another exemplary separator and another exemplary current-collector plate of a fuel cell before the internal manifold is formed. FIG. 5C shows plan views of an exemplary separator and an exemplary current-collector plate of a fuel cell after the internal manifold is formed. FIG. 5D shows plan views of another exemplary separator and another exemplary current-collector plate of a fuel cell after the internal manifold is formed.

FIG. 9 is a sectional view of a gas channel of a fuel cell having an external manifold.

As described above, although a pattern is applied to the member comprising the fuel cell in order to allow clear representation, the pattern does not represent any quality of the member.

DESCRIPTION OF THE PREFERRED EMBODIMENTS

Figure 1:
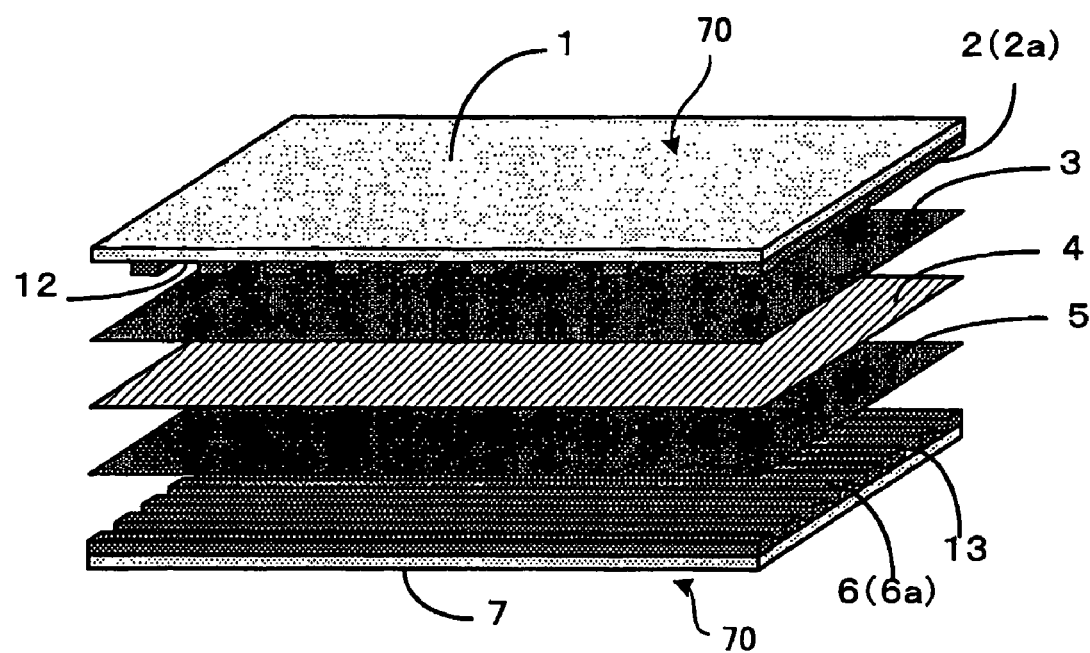
FIG. 1 is a schematic exploded perspective view of a unit cell in a fuel cell stack.

FIG. 1 shows the structure of a unit cell of a fuel cell stack applying this invention.

A separator 1, 7 formed from a porous body such as a carbon body is disposed on the outermost section of the cell. The separator 1, 7 separates a gas channel 12, 13 from a pure water channel 10, 11 described below. Generally both the saturation vapor pressure and the temperature of gas are increased at the inlet of the gas channel 12, 13 due to the heat produced in the cell. Thus the separator 1, 7 tends to dry out upstream with respect to gas flow. Water which is absorbed from downstream sections moves towards dry upstream sections in the separator 1, 7 as a result of capillary action by the pores and the concentration gradient of water. In this case, it is possible to promote the displacement of water by making the size of the pores in the separator 1, 7 different in upstream sections of gas flow from downstream sections of gas flow. Thus it is preferred that the size of pores varies over different sections of the separator 1, 7. The size of the pores in the separator 1, 7 may be large upstream with respect to gas flow and small downstream with respect to gas flow.

A current collector 2 is disposed on the separator 1. The current collector 2 comprises a plurality of substantially square-pole members 2a (first current collector members) which are transversely or longitudinally disposed on the surface of the separator 1. In the same manner, a current collector 6 is disposed on the separator 7. The current collector 6 comprises a plurality of substantially square-pole members 6a (second current collector members) which are transversely or longitudinally disposed on the surface of the separator 7. A gas channel 12 is formed on anode side in the spaces between the substantially square-pole members 2a by disposing the plurality of substantially square-pole members 2a at equal intervals and parallel to one another. A gas channel 13 is formed on cathode side in the spaces between the substantially square-pole members 6a by disposing the plurality of substantially square-pole members 6a at equal intervals and parallel to one another. The substantially square-pole members 2a, 6a are disposed so that the cathode-side gas channel intersects with the anode-side gas channel.

The substantially square-pole members 2a, 6a are preferably solid members impervious to water or moisture formed from a composite material (resin-containing carbon) which contains a major percentage of carbon and a minor percentage of resin (plastic). The resin prevents displacement of water in the composite material.

The substantially square-pole members 2a, 6a may be made of a porous material such as a porous carbon, though their strength is low compared with the strength of a solid member.

A gas diffusion electrode 3 corresponding to an anode and a gas diffusion electrode 5 corresponding to a cathode are disposed inwardly of the current collector 2, 6, sandwiching the membrane electrolyte 4. Gas supplied from the gas channels 12, 13 diffuses towards the membrane electrolyte 4 in the gas diffusion electrodes 3, 5. An electromotive force is generated by the ion exchange mediated by the membrane electrolyte 4.

A fuel cell stack is formed as a result of laminating a plurality of unit cells described above.

Figure 2:
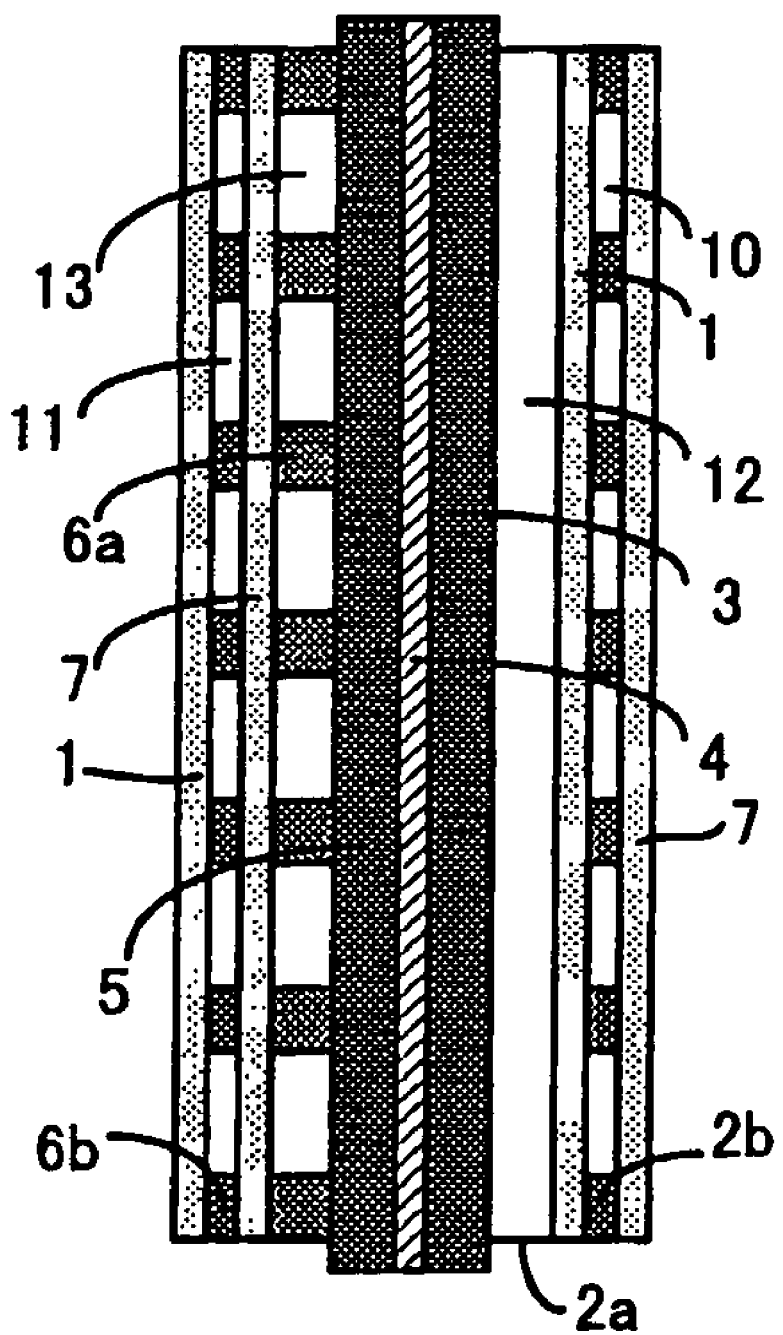
FIG. 2 is a schematic sectional view of a unit cell showing the structure of the pure water channel.

As shown in FIG. 2, the pure water channel 10 is separated from the gas channel 12 for the anode by a separator 1 formed from a porous body. Likewise the pure water channel 11 is separated from the gas channel 13 for the cathode by a separator 7 formed by a porous body. The pure water channels 10, 11 are identical. A pure water channel 10, 11 is formed on the outer face of the separator 1, 7. The outer face of the separator 1, 7 is defined as the face opposite the membrane electrolyte 4 (the face far from the membrane electrolyte 4). The inner face of the separator 1, 7 is defined as the face near to the membrane electrolyte 4.

A plurality of rectangular-pole members 2b, 6b are disposed at equal intervals to cross the outer face of the separator 1, 7 in a transverse or longitudinal manner. The two adjacent separators 1, 7 and the two rectangular-pole members 2b define the pure water channel 10. The two adjacent separators 1, 7 and the two rectangular-pole members 6b define the pure water channel 11.

Since pure water flows in the pure water channel 10, 11, pure water is absorbed by the separators 1, 7 made of a porous material. The separator 1 prevents leakage of gas into the pure water channel 10 from the gas channel 12 for the anode. The separator 7 prevents leakage of gas to the pure water channel 11 from the gas channel 13 for the cathode. When the level of the humidification of the fuel gas supplied to the gas channel 12 or the gaseous oxidant supplied to the gas channel 13 is low, pure water vaporizes from the surface of the separator 1, 7 and controls the level of humidification of the supplied gas. When excess water is produced by the reactions shown in Equations (1) and (2), the excess water is absorbed in the separator 7 by setting the pressure in the pure water channel 10 (11) to be lower than the pressure in the gas channel 12 (13).

In this manner, since the separator 1, 7 formed from a porous body represents a separate component from the current collectors 2, 6 forming the channel, it is possible to manufacture a bi-polar plate 70 which does not require the cost of mechanical processing. In particular, since the shape of a separator 1, 7 using a porous body of low mechanical strength is a flat plate, the separator 1, 7 can be manufactured in a relatively simple manner, and allows for streamlining of the component shape.

Since the pure water channel 10, 11 is formed on the outer face of the separator 1, 7, the separator 1, 7 formed by the porous body is constantly in a humidified state and retains a gas-impermeable state. At the same time, when the gas is dry, pure water drawn into the pores of the porous body from the pure water channel 10, 11 vaporizes into the gas and the gas becomes humidified. When excess water is produced by the fuel cell reaction (1) and (2), the porous body absorbs that water.

Next the method of manufacturing the gas channel 12, 13 will be described. It is possible to form the pure water channel 10, 11 using the same method of construction as the gas channel 12, 13.

Firstly the process of forming the gas channel 12, 13 connected to the external manifold 19 will be described. The external manifold 19 for distributing gas is provided on the outside of the unit cell, namely the outside of the current collectors, the separators, the electrodes, and the membrane electrolyte.

Figures 3A, 3B:
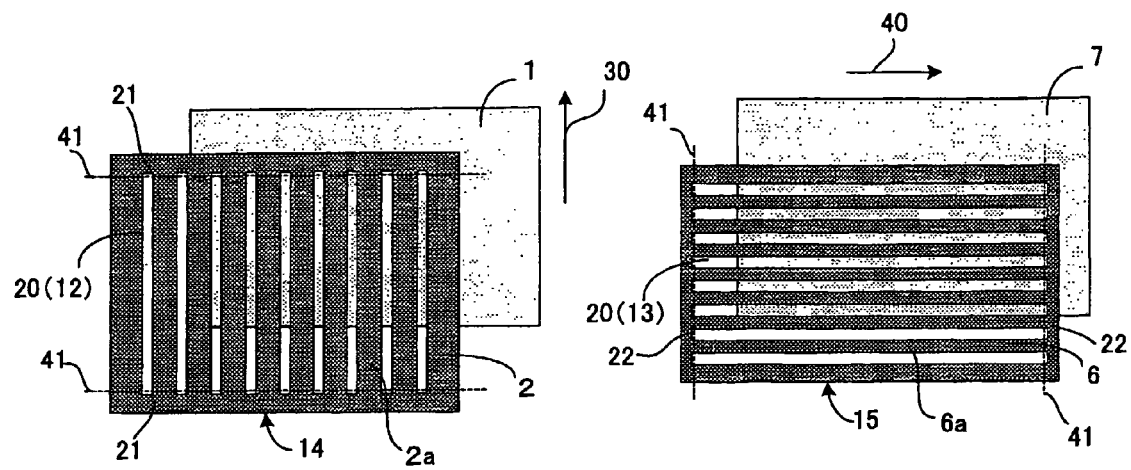
FIG. 3A and FIG. 3B are plane views showing a separator and a current-collector plate on the anode-side/cathode-side of a fuel cell having an external manifold. These figures show the current-collector plate before cutting off the connecting section of the current collector members.

As shown in FIG. 3A, a slit 20 forming the gas channel 12 is provided using a punching operation. The slits 20 are provided at equal intervals on the current collector plate 14 made of the material used in the current collector 6. In the same manner, as shown in FIG. 3B, a slit 20 forming the gas channel 13 is provided using a punching operation at equal intervals on the current collector plate 15 made of the material used in the current collector 6.

Referring to FIG. 3A, the current collector plate 14, is longer than the separator 1 in a longitudinal direction 30. A slit 20 extending in a longitudinal direction 30 is formed on the current collector plate 14 such that the current collector plate 14 is shaped like a ladder or a grating. The slit 20 of the current collector plate 14 is slightly longer than the separator 1 in a longitudinal direction 30. Referring to FIG. 3B, the current collector plate 15 is longer than the separator 1 in a transverse direction 40. A slit 20 extending in a transverse direction 40 is formed as a gas channel on the current collector plate 15. The slit 20 of the current collector plate 15 is slightly longer than the separator 7.

After forming the slit 20 using a punching operation, the end of the gas channel 12, 13 is closed. This is due to the fact that the substantially square-poles 2a comprising the current collector 2 are connected by a connecting section 21 disposed at both ends and the square-poles 6a comprising the current collector 6 are connected by a connecting section 22 disposed at both ends. When the current collector plates 14, 15 are respectively fixed to the separator 1, 7, the connecting sections 21, 22 are not covered by the separator. After the current collector 2, 6 is fixed to the respective separator 1, 7, both ends of the respective gas channels 12, 13 are opened by cutting off the connecting sections 21, 22 along a line 41 passing through the upper ends of all slits or the lower ends of all slits. It is possible to form the gas channel 12, 13 accurately and simply by cutting off the connecting sections 21, 22 after fixing the current collector plates 14, 15 to the face of the separator 1, 7 in this manner. The opening on both ends of the gas channel 12, 13 is connected to the external manifold 19 disposed along the direction in which the unit cells are laminated. (refer to FIG. 6).

Figures 4A, 4B:
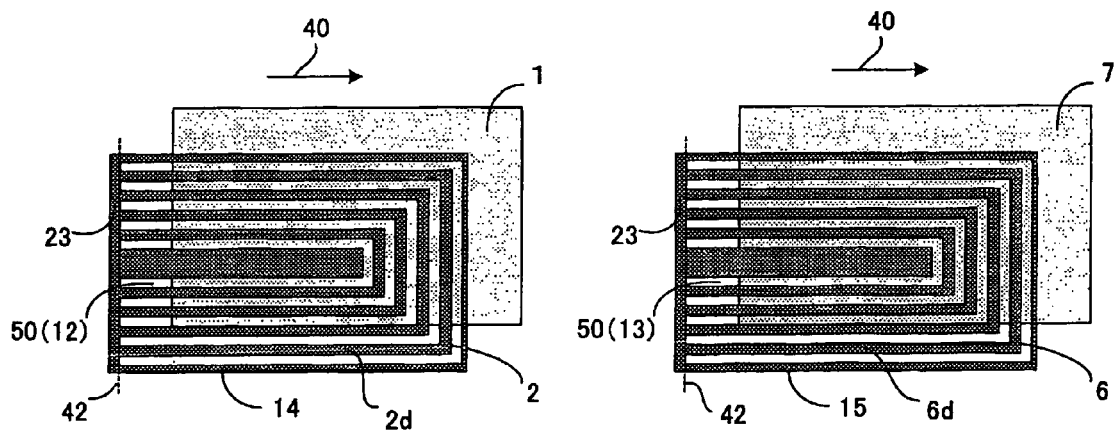
FIG. 4A and FIG. 4B are plan views showing a separator and a current-collector plate on the anode-side/cathode-side of a fuel cell having an external manifold. These figures show the current-collector plate before cutting off the connecting section of the current collector members.

FIG. 4A shows the gas channel 12 extending across the face of the separator 1. FIG. 4B shows the gas channel 13 extending across the face of the separator 7. The gas channel 12, 13 is formed substantially in the shape of a letter "U". Each of the substantially "U"-shaped current collector members 2d, 6d is connected by a connecting section 23.

Substantially "U"-shaped slits 50 are formed as gas channels on the two current collectors plates 14, 15. The current collector plates 14, 15 are longer than the separators 1, 7 in a transverse direction 40. The current collector plates 14, 15 are larger than the face of the separator 1, 7. Thus, when the current collector plates 14, 15 are respectively fixed to the separator 1, 7, the connecting section 23 is not covered by the separator. That is to say, the current collector plate is fixed on the separator face except for the connecting section 23. Thus, the substantially "U"-shaped current collector members 2d, 6d is fixed onto the face of the separator 1, 7.

After fixing the current collectors 2, 6 respectively to the face of the separator 1, 7, the connecting section 23 of the current collector plate 14, 15 is cut off along a line 42 passing through both ends of all slits in order to open the inlet and outlet of the gas channel 12, 13. At this time, the inlet and outlet of the gas channel 12, 13 can be formed on the same end. Thus it is possible to simply form the gas channel 12, 13 by cutting off one end.

Next referring to FIGS. 5A and 5B, a process of forming the gas channel 12, 13 which is connected to the internal manifold 31 will be described. The internal manifold 31 is provided in the bi-polar plate 70 of the cell and distributes gas.

As shown in FIG. 5A, the plurality of gas channels 12, 13 may be formed in a stepped and bent shape and may be aligned in parallel. The inlet of the gas channel is formed on the top left end and the outlet of the gas channel is formed on the bottom right end of the separator 1, 7 in FIG. 5A. The inlet and the outlet are connected to the inner section of the manifold extending in the direction in which the unit cells are laminated. The internal manifold 31 is formed by delineating the punched section 16 by performing a punching operation. After fixing the current collector plate 14, 15 to the respective separators 1, 7, the internal manifold 31 is formed.

FIG. 5C shows the separator 1, 7 and the current collector plates 14, 15 after cutting the punched section 16 using a punching operation. Although the current collector plate 14, 15 is shown separately from the separator 1, 7, the current collector plate 14, 15 is actually fixed to the separator 1, 7.

The stepped square poles 2e, 6e define the gas channels 12, 13 and have the staircase shape similar to the gas channel 12, 13. The square poles 2e, 6e are fixed by the punched section 16 when fixing the current collector plate 14, 15 to the separator 1, 7. Thus it is possible to form the gas channels 12, 13 in a simple and accurate manner by cutting the punched section 16 after fixing the current collector plate 14, 15 to the respective separators 1, 7.

As shown in FIG. 5B, the gas channels 12,13 may be formed in substantially the shape of a letter "S". The gas channels 12, 13 are of a type in which the gas takes one and one half return trips and passes entirely on the surface of the respective separators 1, 7. At that time, the inlet and the outlet of the gas channel 12, 13 are connected to the internal manifold 31 extending with respect to the direction of cell lamination and are formed on the upper left end and the lower right end of the surface of the separator 1, 7. The internal manifold 31 is formed by punching out the punched sections 16.

FIG. 5D shows the separator 1, 7 and the current collector plate 14, 15 after cutting the punched section 16 using a punching operation. Although the current collector plate 14, 15 is shown separately from the separator 1, 7, the current collector plate 14, 15 is actually fixed to the separator 1, 7. The S-shaped square poles 2f, 6f define the gas channels 12, 13 and have the shape similar to the gas channel 12, 13.

Although a porous flat plate is used as the separator 1, 7, either a solid plate or a porous flat plate may be used as the current collector plates 14, 15. However when using porous flat plates for the current collector plates 14, 15, it is required that the plates will be of sufficient strength to support the porous section when the gas channels 12, 13 are formed.

Next the process of preventing leakage of gas from the external manifold 19 will be described.

Figure 6:
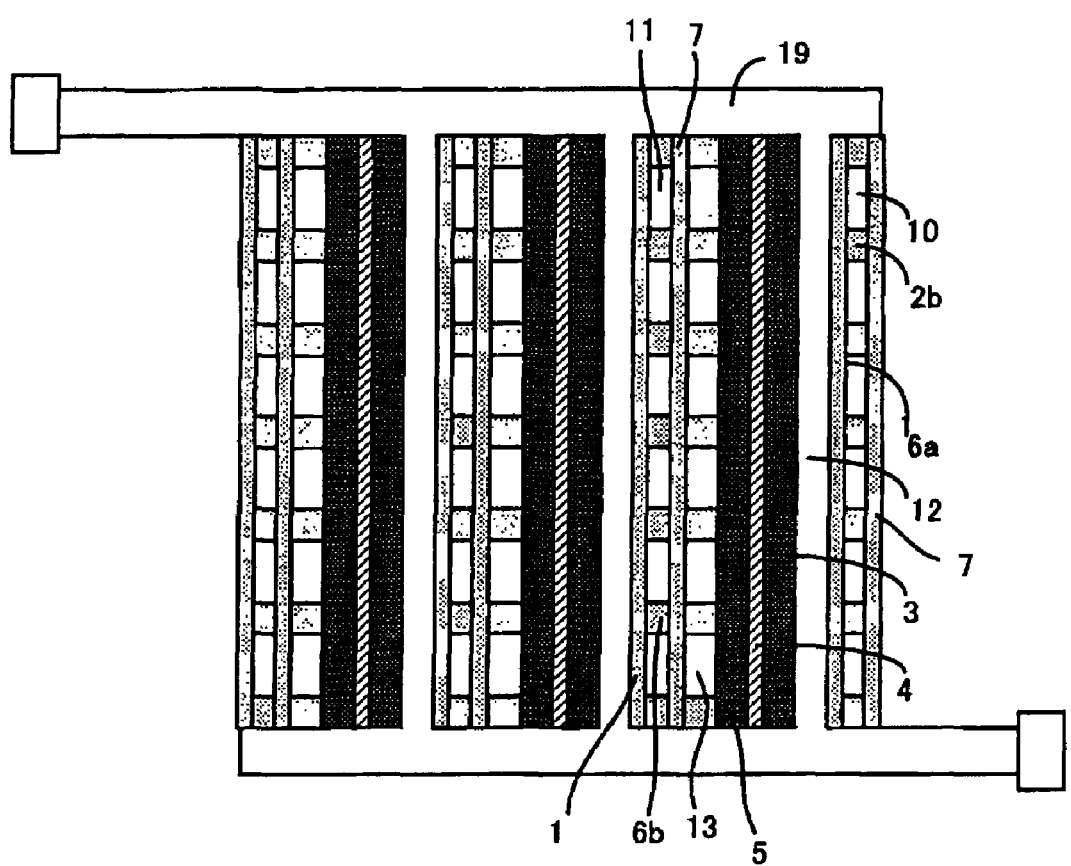
FIG. 6 is a sectional view of a fuel cell stack having an external manifold.

As shown in FIG. 6, when using a porous body for the separator 1, 7 or for the current collector and the separator 1, 7, there is the possibility that gas flowing in the manifold 19 will leak into the gas channel 12, 13. For example in FIG. 6, the wall forming the manifold 19 for distributing the anode gas is partially formed by the separator 7 forming the cathode-side gas channel 13. For this reason, there is the possibility that anode gas will leak into the gas channel 13 through the pores of the separator 7. Furthermore there is the possibility that cathode gas will leak into the gas channel 12 on anode-side for the same reason.

Figure 7A:
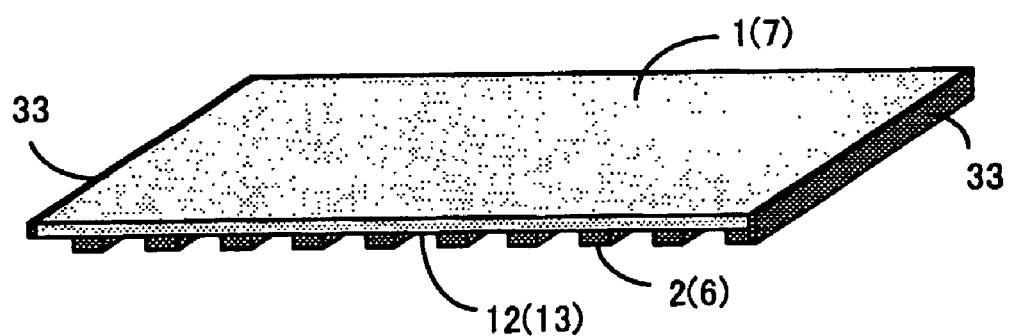
FIGS. 7A and 7B are perspective views of a bi-polar plate, a section of which is impermeable to gas.
Figure 7B:
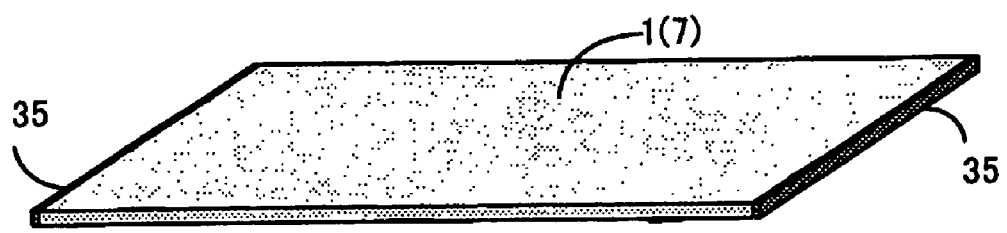

In this embodiment of the invention, as shown by FIG. 7, sections of the separator 1, 7 facing the manifold 19 are adapted to be impermeable to gas. For example in FIG. 7A, resin 33 impregnates the section facing the manifold 19 of the current collector 2, 6 and the ends parallel to the gas channel 12, 13 of the separator 1, 7. Thus gas impermeability is imparted to the faces of the bi-polar plate 70, which faces the external manifold 19. In this manner, since the porous section is sealed by resin, it is possible to ensure prevention of gas leaks from the manifold 19. In FIG. 7B, it is possible to ensure prevention of gas leaks from the manifold 19 by forming the ends of the separator 1, 7 with a solid member 35 impermeable to gas.

Figure 8A:
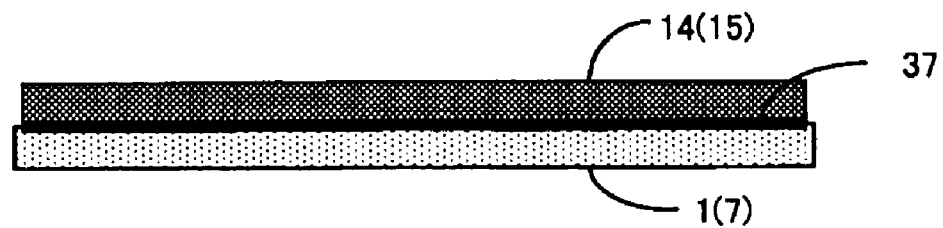
FIG. 8A-8C is a sectional view of a current collector and a separator placed in mutual contact.
Figure 8B:
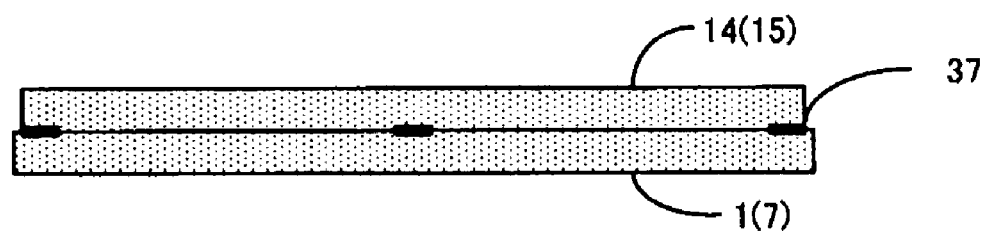
Figure 8C:
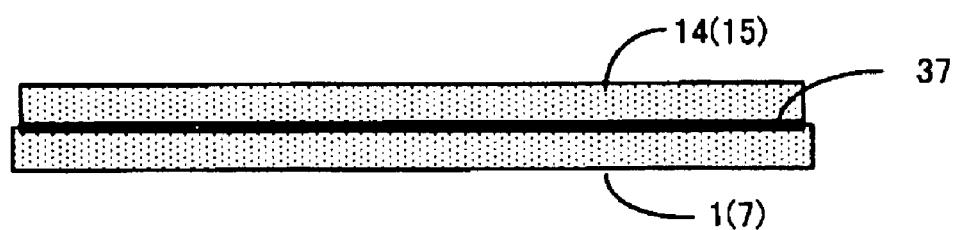

Referring to FIGS. 8A-8C, the process of fixing the current collector plate 14,15 to the face of the separator 1, 7 will be described. When the current collector plate 14, 15 is attached to the separator 1, 7 formed from a porous body, an electrically conductive adhesive 37, for example an adhesive containing silver, is used.

It is possible to maintain the respective cross-sectional areas of the gas channels 12, 13 by fixing the above components using this type of adhesive. As shown by FIG. 8A, the electrically conductive adhesive 37 can be painted onto the entire contact surface between the current collector plates 14, 15 and the separator 1, 7. In this manner, it is possible to prevent deterioration in the functioning of the current collector plates 14, 15. As shown by FIG. 8B, when the current collector plates 14, 15 is formed by a porous body, the electrically conductive adhesive 37 is applied to a part of the contact surface between the current collector plate 14, 15 and the separator 1, 7. In this manner, it is possible to maintain the function of the porous body constituting the current collector 2, 6, for example the function of controlling the level of humidification of the gas or the function of adsorbing water condensing in the gas channel 12, 13. Furthermore as shown by FIG. 8C, when a porous body is used to constitute the current collector 2, 6, it is possible to maintain the characteristics of the porous body by using an adhesive made of a porous material.

The method of manufacturing a fuel cell having an external manifold 19 is summarized below.

In a step S1, a separator 1, 7 is formed from a porous body.

In a step S2, the slits 20 forming gas channels 12, 13 are provided using a punching operation on the current collector plate 15 having a larger surface area than the separator 1, 7.

In a step S3, the current collector plate is fixed to one side of the separator 1, 7 by an electrically conductive adhesive such that the separator 1, 7 does not cover the ends of the slits 20. Thus a bi-polar plate 70 having gas flow channels on one side is formed from the separator 1, 7 and the current collector plate 14, 15.

In a step S4, the sections 21, 22, 23 of the current collector plate 14, 15, which are not covered by the separator 1,7, are cut off.

In a step S5, pure water channels are formed on the other side of the bi-polar plate 70 by performing the similar steps to the step S2-S4.

In a step S6, the anode, the cathode, the membrane electrolyte 4, and the bi-polar plate 70 are laminated.

The method of manufacturing a fuel cell having an internal manifold is 31 summarized below.

In a step S11, a separator 1, 7 is formed from a porous body.

In a step S12, the slits 20 forming gas channels 12, 13 are provided using a punching operation on the current collector plate 15 having a larger surface area than the separator 1, 7.

In a step S13, the current collector plate is fixed to one side of the separator 1, 7 by an electrically conductive adhesive to form a bi-polar plate 70 so that the separator 1, 7 cover the ends of the slits 20.

In a step S14, the internal manifold 31 communicating with the gas channels is formed in the bi-polar plate 70 by performing a punching operation.

In a step S15, pure water channels are formed on the other side of the bi-polar plate 70 by performing the similar steps to the step S2-S4.

In a step S16, the anode, the cathode, the membrane electrolyte 4, and the bi-polar plate 70 are laminated.

Figure 9A:
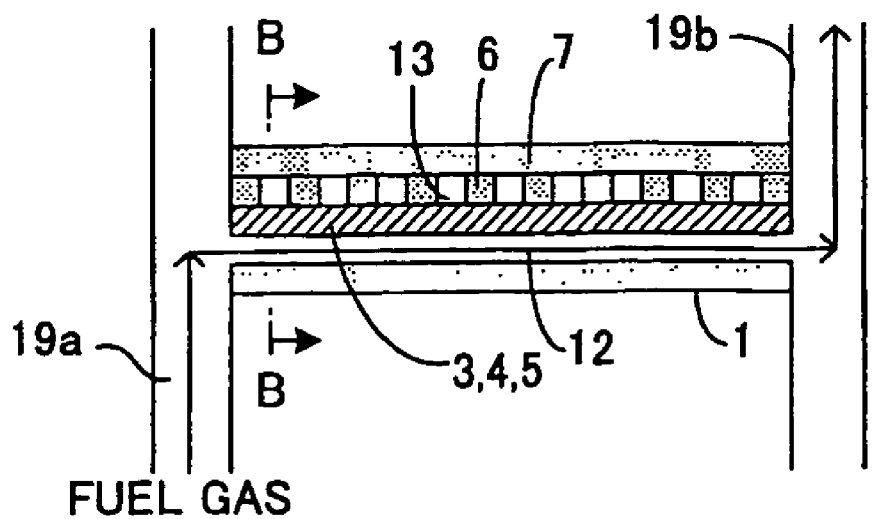
FIG. 9A is a sectional view parallel to the gas channel for the fuel gas.
Figure 9B:
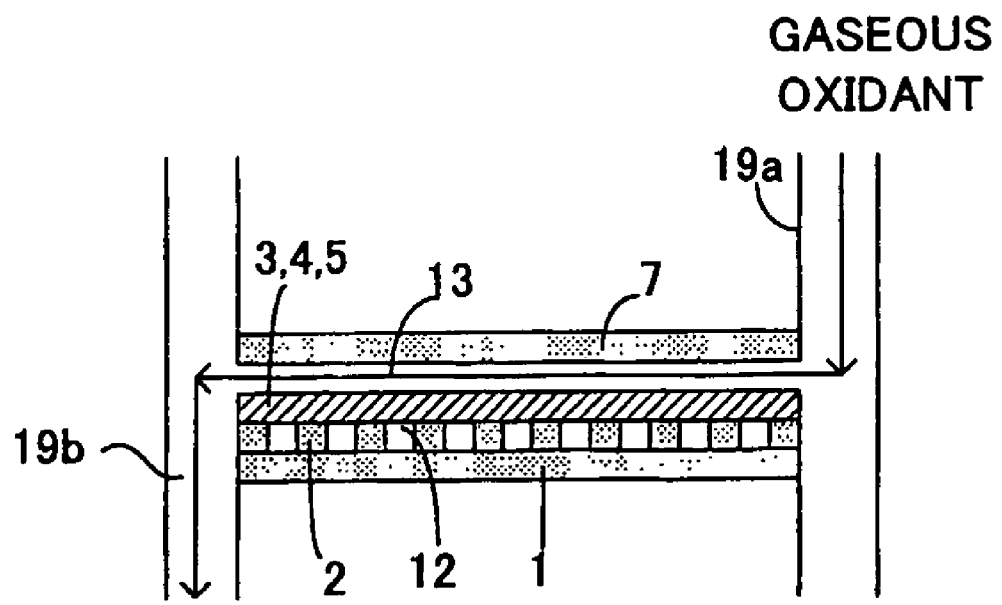
FIG. 9B is a sectional view parallel to the gas channel for the gaseous oxidant channel. The sectional view is taken along the line B-B in FIG. 9A.

The flow of gaseous oxidant and fuel gas in a fuel cell having the external manifold 19 constructed as shown above will be described hereafter using FIGS. 9A and 9B. The flow of gaseous oxidant and fuel gas in a fuel cell having the internal manifold 31 is similar to the flow shown in FIG. 9A and 9B.

Fuel gas and gaseous oxidant are distributed to the gas channels 12, 13 from the inlets of the gas channels 12, 13 which are disposed along the direction of flow of gas in the upstream external manifold 19a. The fuel gas and gaseous oxidant flow along the gas channel 12, 13 and are discharged to the downstream external manifold 19b from the outlet on the discharge side. Thus in contrast to the prior-art example, since a complicated route is not required, the internal pressure loss is low and it is possible to reduce the pressure required to supply gas to the fuel cell.

The entire contents of Japanese Patent Application P2002-110582 (filed Apr. 12, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The invention claimed is:

1. A fuel cell having an anode electrode, a cathode electrode and a membrane electrolyte sandwiched by the anode and cathode electrodes, and producing an electromotive force between the two electrodes by electrochemical reactions between a gaseous oxidant supplied to the cathode and a fuel gas supplied to an anode, the fuel cell comprising:
   two separators each comprising a flat plate-shaped porous body, the two separators being disposed to sandwich the two electrodes, the two separators being water permeable;
   a first current collector disposed between the anode electrode and one separator, the first current collector and said one separator forming a first gas channel allowing flow of the fuel gas;
   a second current collector disposed between the cathode electrode and the other separator, the second current collector and the other separator forming a second gas channel allowing flow of the gaseous oxidant; and
   a manifold connected to one gas channel, the manifold distributing one of the fuel gas and the gaseous oxidant to said one gas channel,
   wherein the manifold is provided on the outside of the current collectors and the separators,
   and wherein at least one of an inlet and an outlet for said one gas channel is formed by a method comprising:
   forming a slit corresponding to said one gas channel on an inner section of a flat plate which comprises the current collector for forming said one gas channel and which has a larger surface area than the separator for forming said one gas channel;
   fixing the flat plate to the separator for forming said one gas channel; and
   cutting off a section of the flat plate which is positioned on an end of the slit and which is not covered by the separator for forming said one gas channel.

2. A fuel cell having an anode electrode, a cathode electrode and a membrane electrolyte sandwiched by the anode and cathode electrodes, and producing an electromotive force between the two electrodes by electrochemical reactions between a gaseous oxidant supplied to the cathode and a fuel gas supplied to an anode, the fuel cell comprising:
   two separators each comprising a flat plate-shaped porous body, the two separators being disposed to sandwich the two electrodes, the two separators being water permeable;
   a first current collector disposed between the anode electrode and one separator, the first current collector and said one separator forming a first gas channel allowing flow of the fuel gas;
   a second current collector disposed between the cathode electrode and the other separator, the second current collector and the other separator forming a second gas channel allowing flow of the gaseous oxidant; and
   a manifold connected to one gas channel, the manifold distributing one of the fuel gas and the gaseous oxidant to said one gas channel,
   wherein the manifold is provided on the inside of the current collector and separator for forming said one gas channel to pass through the current collector and separator for forming said one gas channel in a direction perpendicular to the separator for forming said one gas channel;
   and wherein the manifold is formed by a method comprising:
   forming a slit corresponding to said one gas channel on an inner section of a flat plate which comprises the current collector for forming said one gas channel;
   fixing the flat plate to the separator for forming said one gas channel; and
   cutting off a section of the flat plate which is positioned on an end of the slit and a section of the separator for forming said one gas channel which is positioned on the end of the slit.

3. A fuel cell having an anode electrode, a cathode electrode and a membrane electrolyte sandwiched by the anode and cathode electrodes, and producing an electromotive force between the two electrodes by electrochemical reactions between a gaseous oxidant supplied to the cathode and a fuel gas supplied to an anode, the fuel cell comprising:
   two separators each comprising a flat plate-shaped porous body, the two separators being disposed to sandwich the two electrodes, the two separators being water permeable; a first current collector disposed between the anode electrode and one separator, the first current collector and said one separator forming a first gas channel allowing flow of the fuel gas;
   a second current collector disposed between the cathode electrode and the other separator, the second current collector and the other separator forming a second gas channel allowing flow of the gaseous oxidant;
   a pure water channel provided on a face opposite to the two electrodes of one of the two separators, wherein
   the pure water channel is formed by a method comprising:
   forming a slit corresponding to the pure water channel on an inner section of a flat plate which has a larger surface area than said one of the two separators;
   fixing the flat plate to the face opposite to the electrodes of said one of the two separators; and
   cutting off a section of the flat plate which is positioned on an end of the slit and which is not covered by said one of the two separators.

4. A fuel cell having an anode electrode, a cathode electrode and a membrane electrolyte sandwiched by the anode and cathode electrodes, and producing an electromotive force between the two electrodes by electrochemical reactions between a gaseous oxidant supplied to the cathode and a fuel gas supplied to an anode, the fuel cell comprising:
   two separators each comprising a flat plate-shaped porous body, the two separators being disposed to sandwich the two electrodes, the two separators being water permeable;
   a first current collector disposed between the anode electrode and one separator, the first current collector and said one separator forming a first gas channel allowing flow of the fuel gas; and
   a second current collector disposed between the cathode electrode and the other separator, the second current collector and the other separator forming a second gas channel allowing flow of the gaseous oxidant,
   wherein the first and second current collectors are made of resin-containing carbon containing a major percentage of carbon and a minor percentage of resin such that the first and second current collectors are electrically conductive and impervious to water.

5. A fuel cell having an anode electrode, a cathode electrode and a membrane electrolyte sandwiched by the anode and cathode electrodes, and producing an electromotive force between the two electrodes by electrochemical reactions between a gaseous oxidant supplied to the cathode and a fuel gas supplied to an anode, the fuel cell comprising:
- two separators each comprising a flat plate-shaped porous body, the two separators being disposed to sandwich the two electrodes, the two separators being water permeable;
- a first current collector disposed between the anode electrode and one separator, the first current collector and said one separator forming a first gas channel allowing flow of the fuel gas; and
- a second current collector disposed between the cathode electrode and the other separator, the second current collector and the other separator forming a second gas channel allowing flow of the gaseous oxidant,
- wherein a size of pores in the two separators is different in upstream sections of gas flow from downstream sections of gas flow.

6. A method of manufacturing a fuel cell, comprising:
- forming a separator from a porous plate;
- providing a current collector plate which comprises a current collector and which has a larger surface area than the separator;
- providing slits forming gas channels on the current collector plate;
- fixing the current collector plate to one side of the separator to form a bi-polar plate such that the separator does not cover ends of the slits;
- cutting off sections of the current collector plate which are not covered by the separator; and
- laminating an anode electrode, a cathode electrode, a membrane electrolyte, and the bi-polar plate.

7. The method of manufacturing a fuel cell as defined in claim 6, further comprising:
- providing another current collector plate which comprises a current collector and which has a larger surface area than the separator;
- providing slits forming pure water channels on said another current collector plate;
- fixing said another current collector plate to the other side of the separator such that the separator does not cover ends of the slits; and
- cutting off sections of said another current collector plate which are not covered by the separator.

8. The method of manufacturing a fuel cell as defined in claim 6, further comprising:
- forming a manifold for distributing a gas to the gas channels such that a face of the current collector and a face of the separator comprise a section of an inner face of the manifold; wherein the manifold is connected to the gas channels, and
- imparting gas impermeability to the faces of the current collector and separator comprising the section of the inner face of the manifold.

9. The method of manufacturing a fuel cell as defined in claim 6, wherein fixing the current collector plate to said one side of the separator comprises bonding the current collector plate to said one side of the separator by an electrically conductive adhesive.

* * * * *